United States Patent [19]

Cohen

[11] 4,303,109

[45] Dec. 1, 1981

[54] BEVERAGE DISPENSER HOLDER WHICH IS READILY MOUNTABLE ON A VEHICLE DASHBOARD

[75] Inventor: Donald P. Cohen, Charleston, W. Va.

[73] Assignee: Travel-Drink, Inc., Charleston, W. Va.

[21] Appl. No.: 124,865

[22] Filed: Feb. 26, 1980

[51] Int. Cl.³ .................................................. B65B 3/04
[52] U.S. Cl. .................................. 141/98; 141/375; 141/301; 211/74
[58] Field of Search ................ 141/98, 250–284, 141/367–381, 351–362, 285–310; 211/74

[56] References Cited

U.S. PATENT DOCUMENTS

| 2,768,659 | 10/1956 | Kirkendall | 141/375 |
| 2,815,047 | 12/1957 | Howard | 141/375 |
| 2,867,248 | 1/1959 | Forney | 141/375 |
| 4,098,304 | 7/1978 | Nestrock | 141/375 |

Primary Examiner—Houston S. Bell, Jr.
Attorney, Agent, or Firm—Raymond F. Kramer

[57] ABSTRACT

A beverage dispenser holder which is adapted for ready installation on a vehicle dashboard, such as an automobile dashboard, and which may be easily removed for installation in another vehicle, when desired, includes a body portion for holding the dispenser in dispensing position, a strip of material for supporting the body portion to an upper surface of the vehicle dashboard, as by a hook and loop type fastener, and strip means for holding the body portion to (and away from) a lower portion of the dashboard, preferably also by a hook and loop fastener. It is preferred that the holder be of a synthetic organic polymeric material of suitable strength and flexibility for the desired purpose and that the beverage dispenser be held in inverted dispensing position, with a dispensing valve at the bottom end (when inverted) thereof. The holder preferably includes means for supporting a cup below the beverage dispenser and the strips for fastening onto upper and lower portions of the dashboard may be transversely scored or weakened to facilitate cutting or bending, as desired, so as to conform to the dashboard. Also within the invention are a combination of a beverage dispenser and a holder, as described, installed on a vehicle dashboard, and a dispensing valve-seal combination for a beverage container, especially useful for dispensing beverage from such a container, in inverted position.

20 Claims, 6 Drawing Figures

BEVERAGE DISPENSER HOLDER WHICH IS READILY MOUNTABLE ON A VEHICLE DASHBOARD

This invention relates to a holder for a beverage dispenser. More particularly, it is of such a holder which is adapted for ready installation on a vehicle dashboard so that a driver of the vehicle (or a passenger) may conveniently dispense such beverage, as desired, whether the vehicle is stationary or in motion.

A search for relevant art, which was conducted in the U.S. Patent and Trademark Office in subclasses 137-353; 215-228; 220-212; 222-131; 222-181; 222-185; 224-42.41; 224-42.42R; 224-42.43; 224-42.44; and 224-42.45R, resulted in the finding of U.S. Pat. Nos. 1,220,753; 1,412,330; 2,661,015; 2,698,155; 2,815,047; 2,830,613; 3,411,552; 4,040,549; and 4,127,211.

U.S. Pat. No. 1,220,753 illustrates a holder for an insulated "vacuum" bottle and a cup, with a valve in the vacuum bottle to permit dispensing from it directly into the cup. U.S. Pat. No. 1,412,330 shows a similar holder but specifically mentions that it is installable in airplanes or in other vehicles wherein the operator will not have two hands free to draw coffee, tea or other liquid refreshment or stimulant. The cup shown in this patent is supported by the vacuum bottle and the dispensing valve is operable by rotation of the cup. U.S. Pat. No. 2,661,015 illustrates a readily installable case, mountable on the firewall of a vehicle, for dispensing powdered coffee and hot water, to make a beverage. U.S. Pat. No. 2,698,155 shows a receptacle, mounted on a dashboard by a suction cup or held to a door handle by a hook. U.S. Pat. No. 2,815,047 describes a combination vacuum bottle and cup in a rack, with the cup being movable with respect to the bottle. The rack is supportable by a window or molding inside an automobile. U.S. Pat. No. 2,830,613 illustrates a dispenser for hot or cold beverages, which is fastenable in upright position to an inclined dashboard by an upper bracket and a lower bolt. U.S. Pat. No. 3,411,552 is for an automotive beverage dispenser in which the housing is fastenable by means of a clip to a bracket screwed to the firewall of the vehicle. U.S. Pat. No. 4,040,549 relates to a cup and holder combination in which the holder is mountable on an automobile dashboard by a double adhesive panel attached to the holder bottom. U.S. Pat. No. 4,127,211 shows a cup held to a base mount, which mount is secured to a vehicle dashboard by screws.

The search patents indicate that the installation in a vehicle of a combination of a vacuum bottle or other insulated beverage container or dispenser, such as one of the Thermos ® type, with a cup, in a holder, which may be fastened to a stationary vehicle part, has been suggested before the present invention. Also, various types of containers for beverages have been held to vehicle dashboards. However, none of the prior art patents mentioned and no art known to applicant have shown or made obvious the instant invention and the advantages thereof.

In accordance with the present invention a holder for a beverage dispenser, adapted for installation on a vehicle dashboard, comprises means for holding such beverage dispenser in dispensing position, means for supporting said holding means by fastening of an upper portion thereof to an upper surface of a vehicle dashboard, and means for holding a lower portion of the dispenser holding means to a lower portion of the dashboard. Normally such holder will be so positioned that the beverage dispenser will be inverted and vertical, with a dispensing valve at the bottom (in inverted position) thereof for dispensing into a cup, also supported by the holder, and the holding means and the beverage dispenser will be located rearwardly (considering the normal direction of movement of the vehicle) from the dashboard. Also, the means for fastening the holding means to the dashboard will include hook and loop or equivalent fasteners, parts of which are held to upper and lower dashboard portions, as by adhesive, desirably pressure sensitive adhesive, so that the holder may be readily installable and removable. The holder will preferably be made substantially or entirely of a synthetic organic polymeric plastic material, which initially may be in sheet or strip (or strap) form, with strip sections thereof joined to the holding means and fastened to the vehicle dashboard, which strip sections may include weakened or scored transverse portions for facilitating bending of the strips to dashboard shape, when desired, and for facilitating cutting to lengths of such strips, to assist in installation thereof. Also within the invention are a combination of a beverage dispenser and a holder therefor installed on a vehicle dashboard, and a dispensing valve and seal combination for a beverage dispenser.

The present invention will be readily understood from this specification and the general and the immediately following more detailed descriptions thereof herein, taken in conjunction with the drawing, in which.

Figures 1, 2, 3:
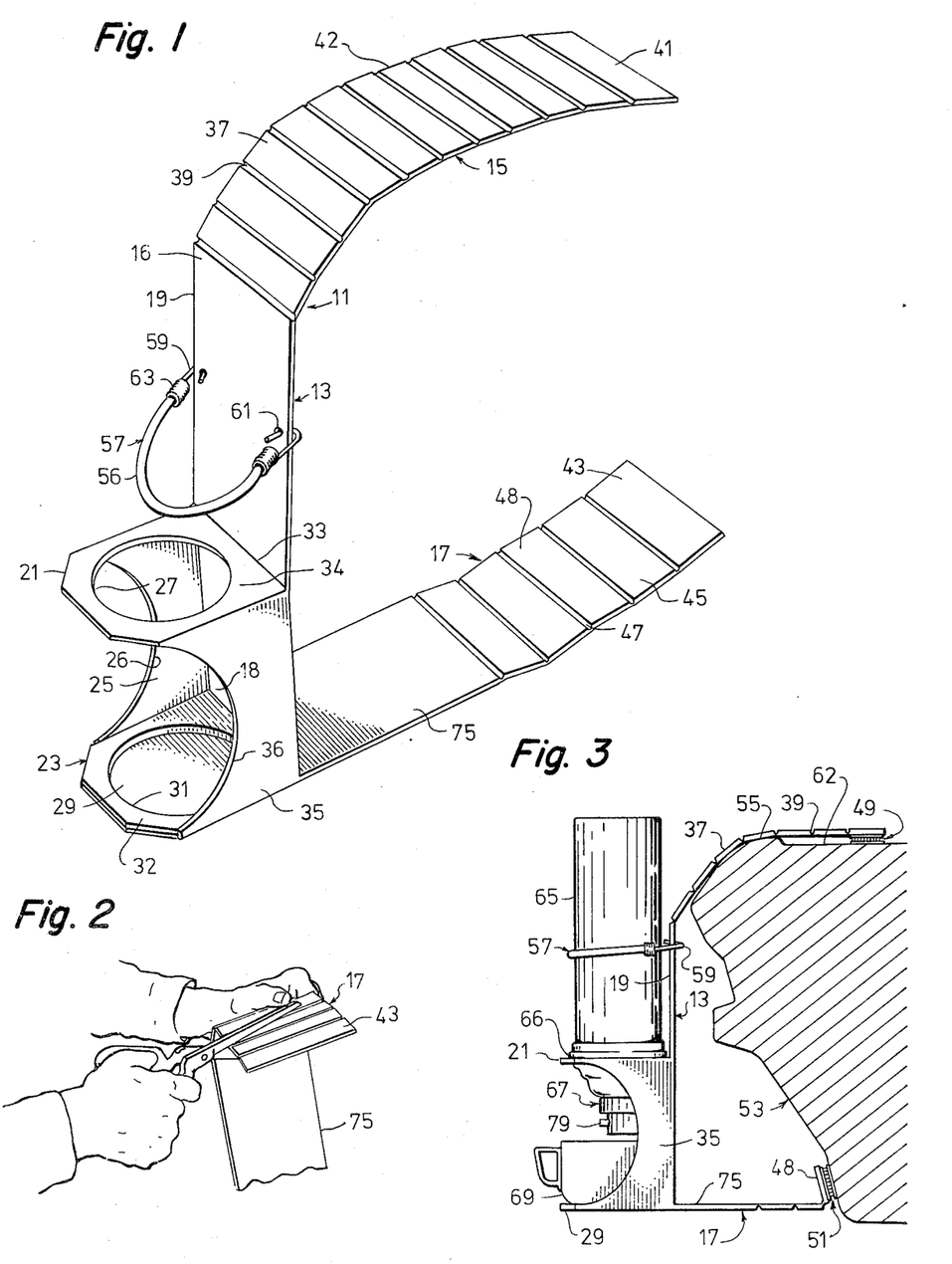
FIG. 1 is a perspective view of the holder of the present invention in normal use position, with extra length scored fastening straps thereof not having been cut to final use length.
FIG. 2 is a perspective view of an installer cutting a strap of FIG. 1 to length prior to installation of the holder on a vehicle dashboard.
FIG. 3 is a vertical side elevational view of a beverage dispenser holder of this invention, with beverage dispenser and cup in place thereon, installed on a vehicle dashboard, which dashboard is shown in cross-section.

In FIG. 1 numeral 11 represents the holder of this invention, which may be considered to comprise three general sections, portions or parts, a holding part or means 13, for holding a beverage dispenser in dispensing position, a supporting part or means 15 for supporting the holding means by fastening of an upper portion 16 thereof to an upper surface of a vehicle dashboard and means, shown as strip 17, for holding a lower part 18 of dispenser holding means 13 to a lower portion of the vehicle dashboard.

Beverage dispenser holding means 13, as illustrated, includes backing strip portion 19, normally a flat strip of plastic material, which is preferably integral with supporting part 15, a first horizontal support 21 extending toward the passenger compartment or the rear of the vehicle from backing member 19, a second horizontal supporting member 23, lower than the first horizontal support 21, and side walls 25 and 35, joined to backing strip 19 and to first and second horizontal supports 21 and 23, helping to position and stabilize such supports. Support 23 has a horizontal circular opening therein defined by wall 31 in an upper section 32 of such support. A floor portion 29 of said support may be integral with lower holding strip 17. Thus, inner wall 31 of the opening in the second horizontal support 23 acts to inhibit movement out of the holder of a cup which may be placed in the holder, supported by floor member 29. Walls 25 and 35, with backing strip 19, also help to prevent undesired movement of the cup out of position but the curved surfaces 26 and 36 allow ready access to the cup for removal, even when the cup handle is not readily accessible. The holding means 13, as constructed, is sufficiently rigid so as to be capable of supporting normal vacuum or other insulated (thermal) beverage dispensing bottles or containers, which are usually of generally cylindrical shape and when full normally weigh from about 0.5 to 3 kilograms, e.g., 0.7 to 1.5 kg.

The first horizontal support 21 of holding means 13 has a circular opening therein defined by wall 27, which opening is of a size so as to be able to support a beverage dispenser resting on the top 34 of support 21. Such support is better shown in FIG. 3, wherein a suitable collar section 66 of inverted dispenser 65 is shown resting on first horizontal support 21 of holding means 13. Because beverage dispenser 65 will normally be of an appreciable length, with only collar 66 or equivalent part resting on surface 34 of support 21, elastic means 57 are provided for fastening the beverage dispenser to vertical backing strip 19, so as to prevent tilting thereof and so as to secure it in desired position. Elastic fastener 57 includes an elastic portion 56 and hooks 59, adapted at 63 to grip the elastic cord and for fitting into openings or holes 61 in backer 19. The holding of beverage dispenser 65 in place is illustrated in FIG. 3, wherein the external cylindrical wall of the dispenser is shown spaced a short distance from backing 19, but it will be clear that when elastic 56 is strong enough (and taut) the dispenser wall and backing 19 may be in contact. In such case, the beverage dispenser will coact with the holder and help to strengthen or rigidify the holding means 13 thereof. Such strengthening may also be accomplished by having spacing parts, not shown, installed on the backing member so as to conform with the shape of the dispenser, or such spacer or spacers may be fitted between the backer and the dispenser when the invented holder is in use. Of course, holding means 13 may be strengthened further by applications of additional amounts of cement or adhesive (or by improving solvent fusion or heat sealing) at lines of joinder of parts, as at line 33 between backing 19 and first horizontal support 21.

Supporting means 15 shown integral with backing 19, although it can be joined to the backing, includes a plurality of transverse strip sections 37, separated by V-shaped depressions, weakenings or score lines 39, which are normally of such a depth or are so scored or weakened that support 15 may be bent to a shape so as substantially to conform to an upper portion and an upper surface of a vehicle dashboard. As shown, the scoring V's are on the top of strip 15 but it is within the invention also or alternatively to locate them on the under portion, providing that the desired flexibility can be obtained. The V's may be omitted when the material is otherwise flexible enough to conform substantially with the dashboard upper surface. In some instances, as will be apparent further with respect to holding means 17, the scored or weakened support may be form-retaining and flat, despite the score lines, but may be bent or strained at such lines so as then to impart a desired degree of flexibility to the supporting strip. For example, when the support 15 (and backing member 19 and other holder parts) are of polyvinyl chloride of a thickness of about 2 to 4 mm. and of a width of about 8 to 12 cm., with the V-scoring penetrating to within 0.5 to 1 mm. of the smooth strap face, unless intentionally additionally strained at the score line to cause a shape change the strap can maintain its initial position, which may be flat.

In FIG. 1 no means are shown for removably adhering the flexible strap member 15 to the upper surface of a dashboard. However, such means may be provided installed, usually on the under side of strap member 15, for subsequent affixation to the dashboard upper surface but normally such a fastener or fastener member component, such as hook and loop portions of a hook and loop fastener, corresponding parts of hook and hook fasteners, and in some cases, adhesive fasteners, are provided with the present holder parts, but not attached to them, and are joined to them when installation of the holder on a vehicle dashboard is to be effected. Thus, for example, in a preferred embodiment of the invention, hook and loop fasteners, such as those shown at 49 and 51 of FIG. 3, will be joined to suitable panels of strips 15 and 17 after the holder is fitted to the vehicle dashboard and after such strips are cut to lengths, if desirable. Such joinder may be effected by removing protective covering strips, not shown but usually present over pressure sensitive adhesive covered surfaces held to the hooks (and/or loops), and then pressing the adhesive part against either the holder part or the dashboard or both at a suitable location or locations. Normally it will be preferably to mount the loop portions of the hook and loop fasteners on the vehicle dashboard and the hook portions on the fitted matching holder part.

As shown in FIG. 3, wherein the supporting means at the upper portion of the holder includes seven transverse sections, four such sections, beginning with the terminal section 41 (FIG. 1), will be removed and the hook portion of the hook and loop fastener will be joined to the under side of section 42 (FIG. 1) thereof. Similarly, with respect to lower holding portion 17 of the dispenser holder, panels or sections 43 and 45 will be removed, as by cutting with a pair of scissors, as shown in FIG. 2, and the hook portion of a hook and loop fastener will be joined to the remaining terminal section 48 of the holder, as shown in FIG. 3. Such section may then be turned back on itself, as shown in FIG. 3, so as better to conform to the shape of dashboard 53, and the holder may then be joined to the dashboard at upper (horizontal) and lower (inclined) surfaces thereof, although joinder at other suitable locations, providing that one of such is an upper dashboard surface, may also be acceptable. Although it is preferred to join the upper supporting means to a horizontal dashboard surface, as at 62, and in some cases, as illustrated, to "snub" the support over a protruding portion, as at 55, or an edge of the dashboard, so as better to support the holding means 13, various other of such surfaces may also be used as site for affixation of the hook and loop type fasteners or suitable substitutes.

In FIG. 2 the cutting to size of supporting means 17 is illustrated but of course the same technique may be employed with respect to cutting support 15 to desired length, as was mentioned in the preceding paragraph. In FIGS. 1-3 section 75 of holder 17 is shown unscored but in some cases it may be desirable to score this portion too. However, sometimes section 75, with or without adjacent scored portions may be employed as a spacer, to prevent holding portion 13 from tipping from a vertical position, which tipping might otherwise be such that a lower part of the holding portion 13 could approach a lower part of the vehicle dashboard.

FIG. 3 has been discussed to a significant extent in conjunction with the description of the apparatus of FIG. 1. As seen in FIG. 3, inverted beverage dispenser 65 includes a dispensing valve-seal combination 67 which holds the beverage in container 65 until dispensing button member or valve operator 79 is pressed, which releases the beverage to flow into cup 69. The workings of a suitable valve-seal combinations will be apparent from the description of FIG. 4.

Figure 4:
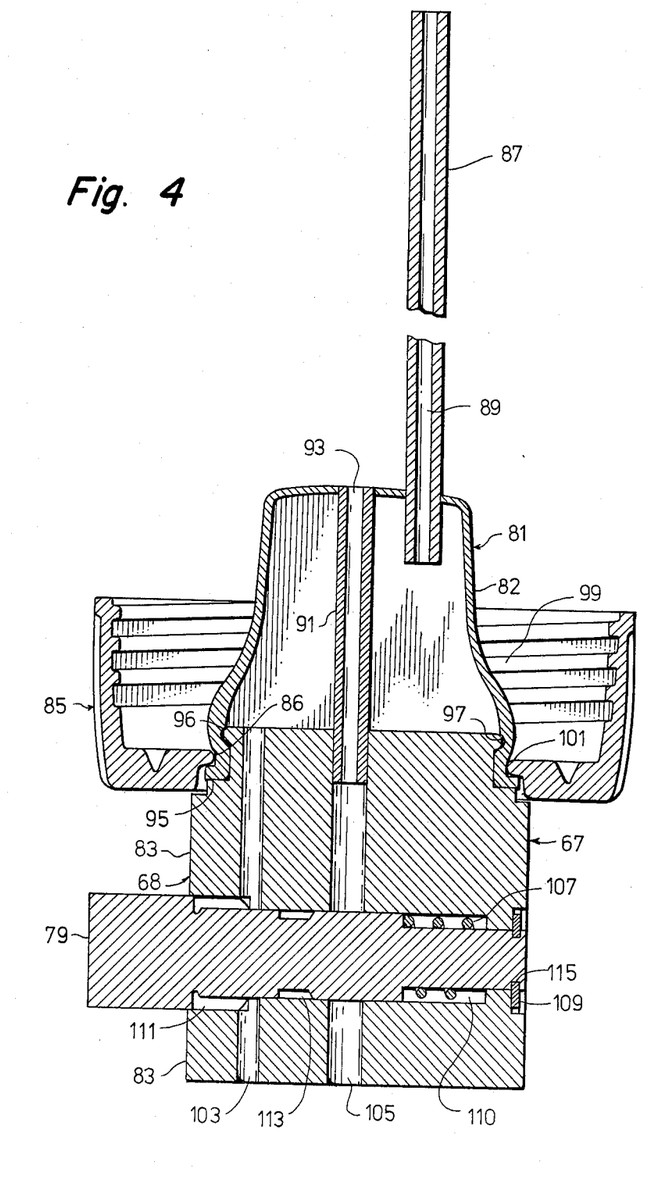
FIG. 4 is a vertical sectional elevational view of a dispensing valve and seal combination for a beverage dispenser, useful with the beverage dispenser, cup and holder of this invention.

In FIG. 4 dispensing valve and seal combination 67 is illustrated, comprising: a hollow resilient sealing plug portion 81, suitable for closing a beverage dispenser opening when in place at the inverted dispensing end thereof; a dispensing valve 68, having a body portion 83 fitted at an end thereof to the plug by means of lip 96 on the valve portion, which fits in an annular recess in the wall 82 of plug 81, which recess is bounded by wall portion 97; and cap means 85 for removably holding the valve and the plug to the dispenser at the dispensing end thereof. Cap 85 includes a lip 86 which fits in a recess formed in wall portion 101 of plug 81 so that when cap threads 99 are screwed onto a threaded portion (not shown) of a dispenser, they will press plug 81 into sealing engagement with the inner walls of the dispensing opening of the dispenser and by means of lip 96 and wall portion 97, will also hold the valve body 68 tightly in place.

The sealing plug portion 81 of the valve-seal article includes a somewhat resilient, "surface of revolution" plug- or cork-type sealing wall member 82 having parts such as were previously described, together with an annular flange 95, against which valve body 83 presses when the plug is installed tightly against the opening of a beverage dispenser, plus discharge passageway 93, having a cylindrical or other suitable tubular wall 91 defining it, through which passageway liquid to be dispensed may flow, and vent 87, in which there is a cylindrical venting passageway 89. Both the discharge and venting passageways are so joined to the rest of the plug and, in the case of the discharge passage, communicate with the dispensing valve so that liquid and venting gas flow as intended without leakage. In the body portion 83 of dispensing valve 68 discharge passageway 105 communicates with passage 93 when button member 79 is actuated (moved to the right), so that annular passageway 113 about the button member shaft allows passage of liquid from the upper to the lower portion of passage 105. When the dispensing button member 79 is in normal position, in which annular passage 113 is not aligned with passageway 105, said passageway is sealed off by the button member and flow of beverage therethrough is prevented. It is noted that movement of the button member to dispensing (and venting) position is effected by pressing such member against helical or coil spring 107, located in valve body 83 in an opening about a portion of button member 79 where such member is of reduced diameter. The button member is also grooved at 115 and a snap washer 109 is fitted in said groove to maintain the button member in proper relationship with the body portion of the valve. When button member 79 is activated, in addition to clearing passage 105, it also keeps annular groove 111 in a venting position so that air may pass through it and through venting passageway 103, with which it still communicates. Thus, as beverage is dispensed, atmospheric air replaces it in the dispenser, preventing any flow interruptions due to vacuum holding liquid in the dispenser and preventing objectionable gurglings and irregular flows due to simultaneous gas and liquid movements through the dispensing passageway 105. Valve body portion 83 does not include a shaped discharge spout as illustrated but such may be provided, if desired.

Figure 5:
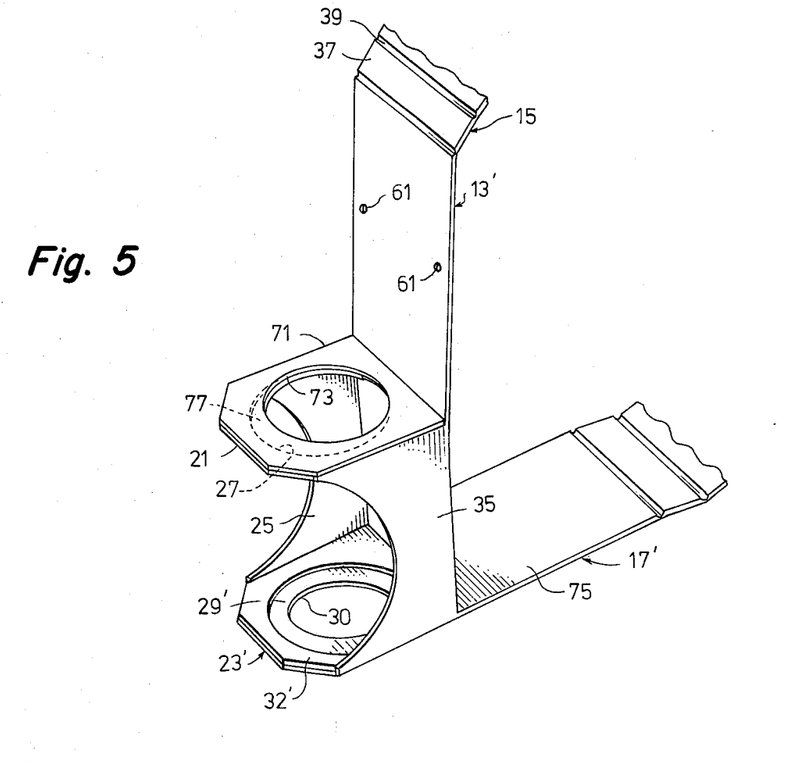
FIG. 5 is a fragmentary view, in perspective, of a holder of this invention, showing the presence of an adapter therein for adapting it to use with smaller sized beverage containers.
Figure 6:
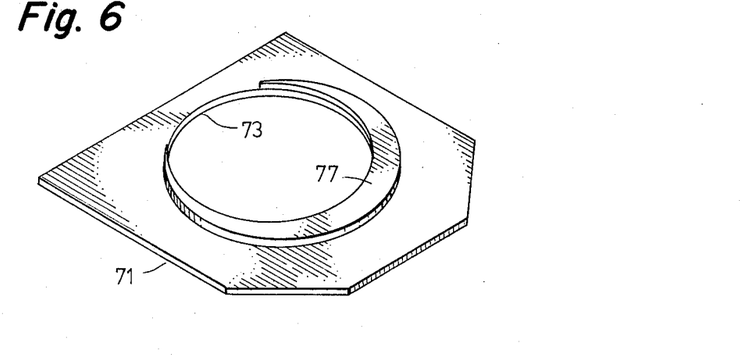
FIG. 6 is a perspective view of the adapter of FIG. 5, showing the bottom thereof.

FIG. 5 is essentially the same as FIG. 1 except for the omission of portions thereof, the insertion of an adapter to support a smaller beverage dispenser, and the presence of an opening in the base for supporting the cup. Accordingly, only such changes will be discussed. Details of the adapter are shown in FIG. 6. In FIG. 5 parts similar to those of FIGS. 1 and 3 are primed whereas those identical are identified by the same unprimed numerals. Numeral 71 represents an adapter supporting member which has an opening of suitable size therein, the wall of which opening is represented by numeral 73. A beverage dispenser of reduced size, too small for good installation on the holder of FIG. 1, may have a collar or other suitable portion thereof resting on the upper surface of support 71, with "lower" parts of the dispenser, including the valve mechanism, being below support 71 and under the opening therein. Supporting 71 is normally held in place by only an adapting section 77 thereof, which fits within the opening in support 21 and presses against wall 27 thereof. Normally, adapter 77 is shaped to contact at least three points more than 180° apart on wall 27 and preferably such contact will be over at least 235°, preferably more, e.g., about 270°, as shown.

Although the first and successful models of the present invention were like those of FIGS. 1 and 3, with the cup or tumbler resting on a floor portion 29, preferably surrounded by wall 31, it has been found that more positive holding of a cup can be obtained when as in FIG. 5, bottom 29' has an opening therein defined by a wall 30, which is adapted to fit the outer wall of a cup and thereby support it. Preferably the cup or tumbler is at least partially tapered or curved so as to promote good supportive fitting, and the bottom thereof, when supported, is lower than the holder bottom. If desired, the opening defined by wall 30 may be larger, part 32' may be omitted, and/or an adapter like that indicated at 71, or the equivalent, suitably modified, can be used to adapt the holder for supporting smaller cups or tumblers.

The described holders for beverage dispensers are like those made and tested in his own vehicle by the present inventor. Such holders operated satisfactorily, being especially useful for holding in position from the dashboard of the inventor's automobile a vacuum bottle of hot coffee and a cup, so that on long trips at night the inventor could serve himself coffee or other beverage while driving, thereby helping to maintain his alertness to road conditions. However, it is contemplated that the particular constructions shown, although presently the preferred embodiments of the inventions, may be altered when such holders are manufactured by commercial techniques, such as those utilized in the manufacture of synthetic organic polymeric materials and in mass production. Also, the invention is useful for installation on dashboards or similar structures of other vehicles than automobiles, such as trucks, campers, motor homes, recreational vans, boats and airplanes, The material of construction of the illustrated holder, while presently preferably polyvinyl chloride strip, may be made, at least in part, of other synthetic organic plastics and of other structural materials, such as wood, paperboard, elastomers, e.g., natural and synthetic rubbers, metals, metal alloys and glasses, when suitable, and mixtures of different kinds of plastics and mixtures of one or two types of plastics and other construction materials may be employed. Among the useful plastics may be mentioned, in addition to polyvinyl chloride, polyethylenes, polypropylenes, nylons, polyethers, polyesters, especially when fiberglass reinforced, polyurethanes, phenol formaldehydes, urea formaldehydes, polystyrenes and acrylonitrile-butadiene-styrenes, but of course, various other polymers may also be employed. In some instances a comparatively rigid plastic material, such as polystyrene or fiberglass reinforced polyester, may be used for the holding portion of the invented article, with more flexible material, such as polyethylene, neoprene, polyurethane, silicone rubber or PVC, being employed for the upper holding means, for holding onto the dashboard upper surface, and polyvinyl chloride being used for the lower holding means (which may or may not be integral with cup support 29 or similar structure).

When the holder is assembled from a plurality of pieces it is preferred that when possible such pieces be of thermoplastic material so that they may be heat sealed or "welded" together but solvent fusion techniques and the use of cements and adhesives are also operative. When adhesives are employed those preferred include the epoxy resins but acrylates, rubber and silicone rubber cements, proteinaceous glues and various other joining compositions may be employed. Similarly, one may use other fastening techniques, including nailing, stapling, sawing, screwing, riveting, slotting and interfitting. Instead of fastening parts together to make the present holder or portions thereof, such holder and individual parts thereof may be made by molding, rolling and stamping techniques, among others. For example, the weakening grooves in the strap portions of the invented article may be made by rolling, stamping or pressing and the holding portion, except for the elastic holding means, may be injection molded or may have parts thereof stamped or molded to shape. It is considered that the entire holder, including the straps, can be made by injection molding, with other suitable holding means being substituted for the elastic. Thus the elastic means 57 may be replaced with a resilient clasping type holder, ends of which are integral with backing member 19 and other ends of which, not in contact with each other, tend to close about the beverage dispenser when it is in position in the holder.

The particular structure indicated may be changed otherwise too, as for example, by having various parts thereof of curved walls instead of straight and by making or decorating the parts of the holder to match the decor of the vehicle on which it is to be employed. The backing member and strip structures may have the shapes thereof altered, as by having openings made therein, so that they may be mounted on a dashboard over other dashboard components, such as a radio, speakers, ashtray and air conditioning and heating air passages, while still not blocking such components. Alternatively, such parts may be marked or scored for removal of portions thereof, if desired.

An important aspect of the present invention relates to the ready installation thereof in different types of vehicles with various types of dashboards, and in the portability of the holders. Although other types of holding means may also be employed, a large part of the convenience and many of the advantages of the present invention are the result of the use of hook and loop or similar types of readily disengageable fastening means to support the holder on the vehicle dashboard. Vehicle dashboards may be made of various materials and although synthetic organic polymeric dashboards are today most common, metal dashboards, wood dashboards, foamed plastic dashboards and dashboards made from combinations of such materials are being used, and the present invention is installable on any of these. In the drawing the use of a single hook and loop type fastener for holding the top support to the upper dashboard surface is illustrated and a single such combination unit is shown for holding the bottom strap in position with respect to the dashboard. Although the illustrated installation is a satisfactory one, when greater holding power may be desired additional hook and loop fastener combinations may be employed. The hook and loop fasteners may be held to the holder for the beverage dispenser by adhesive, such as a plasticized polyisobutylene adhesive or other tacky synthetic organic rubber or elastomeric adhesive material and the mating portions of such fasteners may be held to the dashboard by similar adhesives. If desired, permanent adhesives, such as epoxy resins, may be utilized to hold parts of the hook and loop fasteners (preferably the loop parts) to the dashboard and/or, to the holder straps. If more positive seals are desired (although such are usually not necessary) the fastener portions may be held to the dashboard and the holder by staples, tacks, screws, nails, rivets or other such means. The hook and loop fasteners employed will often be of a type commercially sold under the trade marks VELCRO ® or Scotchmate ®. Such hook and loop or hook and pile fasteners, as they are also called, are described in U.S. Pat. Nos. 2,717,437; 3,000,384; 3,009,235; 3,076,244; 3,130,111; 3,147,528; 3,154,837; 3,192,589; 3,387,345; and 3,900,652, the disclosures of which are incorporated by reference herein. Such fasteners are often made of nylon but also can be made of various other materials in whole or in part, such as polyesters, acrylics, acetates, cotton and cotton-synthetic blends. The only strict requirements for them are that the hook members should be sufficiently firm to grip the loop or pile members and should be sufficient resilient to return to initial position after release from the loops, and that the loop and pile members should be sufficiently strong so as not to be excessively broken or permanently distorted upon removal of the hooks from holding contact with the pile. Usually the hooks and piles are joined to backing members, such as tapes, which may be made of various materials, (nylons and polyesters are preferred) and such tapes provide ready means for fastening to surfaces on which the removable fasteners are to be held. Alternatively, the backing members for the hooks may be only the sheet from which they were formed.

In FIG. 3 of the drawing it is seen that a force which holds the beverage dispenser and the holder for it is transmitted to the hook and loop or hook and pile fastener 49 in a horizontal direction. Normally the hooks and loops of the fasteners are designed to be capable of holding most strongly when the fasteners are pulled apart in a direction normal to their backing members. Thus, although satisfactory for many purposes in accordance with the present invention, the holding strength of the hook and loop fasteners 49 may be increased if the hooks and/or loops are directed in such manner as to maintain maximum holding capability. This can be done by orienting the loops, as by flattening them somewhat and/or orienting the hooks, as by bending them, so that there is a maximum hooking effect and too easy bending back of the hooks to a straightened, release position is minimized when separating forces are applied in a horizontal plane. Thus, the force needed to disengage the hooks from the loops will be greatest in a horizontal plane, when the hooks and loops are on substantially horizontally positioned backing or tape materials installed on an upper surface of a vehicle dashboard. The situation is not as important with respect to the lower fastening means 51 but the designs of the hooks and loops (or hooks and hooks, etc.) for use thereat may also be modified according to the same general principles. While it is preferred that the hook and loop or similar fasteners be held to the dashboard by a pressure sensitive adhesive which is satisfactorily adherent to the dashboard material(s), for convenience of application, other such fastening means or tapes may be otherwise held, as by temporary cements, permanent adhesives, heat sealing, tacking, stapling, riveting etc. It will be preferred for the loop portions of such fasteners to be installed on the dashboard because these are less conspicuous and are less liable to be damaged by contacts with them when the holder is not in place.

Installation of the present device is simple and almost foolproof. Although parts thereof can be assembled by the vehicle owner or installer, normally the holder will be provided assembled and it will only be necessary for the vehicle owner to fit it to his vehicle's dashboard, bend the strips to shape and cut off any extra lengths of material, after which the hook and loop or other such fasteners (which facilitate ready removability of the holder from the dashboard), may be installed. It has been found that the strips of hooks and loops will usually be of an area in the range of 10 to 50 sq. cm. or 15 to 35 sq. cm., e.g., about 23 sq. cm. and that such is sufficient to sustain a dispenser weight of about 1 to 2.5 kg., to support about ½ to 2 liters of liquid. Usually installation of the fastener portions is effected first on the dashboard and then on a matching portion of the holder but this procedure may be varied to fit the circumstances. Double sided adhesive tapes may be used or hook and loop fasteners having pressure sensitive adhesive thereon. If other adhesives, glues or cements are employed, it is preferred that they be such as are removable from the dashboard surface, if such removal might be desired (as when the dashboard will no longer be used to support the holder). After installation of the holder the beverage dispenser and the cup may be inserted and held in place, either in the original or adapted holder. Then, with the dispenser filled with hot coffee, cold drink, water or other suitable liquid, a journey may be commenced, with refreshing or stimulating liquid close at hand so that a driver may be able to dispense it and drink it without need to halt the vehicle.

The ready removability and portability of the present holder and similar devices within the present invention make it possible to use one holder on a plurality of vehicles, as desired. Thus, portions of hook and loop fasteners, preferably the loop or pile portions, may be affixed to suitable locations on a plurality of vehicle dashboards and the holder may be selectively employed with any of them, to hold the beverage dispenser and cup in place on the dashboard of any of such vehicles, If desired, in those cases where the dashboards are so different that different lengths of holding strap are needed, such strap may be folded back, rather than cut off, for installation on one such vehicle, so that it may be unfolded and may be used on a different vehicle, with a larger dashboard or a "deeper" dashboard surface. If desired, additional dispensing means may be held to the present holder, for holding and dispensing sugar, cream, creamer, etc., but normally such is not necessary. Also, a dispenser with an opening at the top thereof can be supported but it would lack many of the advantages of the present holder.

The invention has been described with respect to various illustrations and embodiments thereof but is not to be limited to these because it is evident that one of skill in the art, with this specification before him, will be able to utilize substitutes and equivalents without departing from the invention.

What is claimed is:

1. A combined holder for a beverage dispenser and a support for a receiver of a dispensed beverage, adapted for installation on any of a plurality of different types of vehicle dashboards having upper surfaces of different shapes, and having lower surfaces of different shapes, which comprises means for holding such beverage dispenser in dispensing position when the combined holder and support is installed on such a dashboard, means for supporting such receiver in alignment with such beverage dispenser, so that beverage dispensed from the dispenser will be dispensed into such supported receiver, flexible means for conforming to any of a plurality of different upper surfaces of any of such vehicle dashboards and supporting said dispenser holding means and receiver supporting means by fastening of an upper portion of said holding means to such upper dashboard surface, and means for conforming to any of a plurality of different lower surfaces of any of such vehicle dashboards and for holding said combined holder and support to said lower dashboard surface by fastening of a lower portion thereof to such lower surface.

2. A combined holder and support according to claim 1 wherein the flexible means includes a flexible strap member and means for readily removably holding such strap member to any of the plurality of dashboard upper surfaces.

3. A combined holder and support according to claim 2 wherein the means for fastening a lower portion of the combined holder and support to such lower dashboard surface includes a strap member having a flexible portion and means for readily removably holding said lower portion of the combined holder and support to a lower portion of the dashboard.

4. A combined holder and support according to claim 3 wherein the means for holding the beverage dispenser in dispensing position holds it in vertical position, when installed on the dashboard, and the support for the receiver is a support for a cup, which cup is supportable in a position wherein it is aligned coaxially with the beverage dispenser, and from which position it is readily removable.

5. A combined holder and support according to claim 2 wherein the flexible strap member is of a synthetic organic polymeric plastic material.

6. A combined holder and support according to claim 4 wherein the flexible strap member for conforming to any of a plurality of different upper surfaces of any of a plurality of different types of vehicle dashboards is of a thickness which would normally be form retaining and is scored or otherwise weakened so as to be bendable or flexible to comforn to the shape of the upper dashboard surface, and so as to facilitate cutting to length suitable for the dashboard on which it is to be installed.

7. A combined holder and support according to claim 4 wherein the means for holding the beverage dispenser holds it inverted, with a dispensing opening therein at the lower end thereof, such holding means comprises a vertical backing strip, a first horizontal support joined to the backing strip and with an opening therein, on the part of which first horizontal support around such opening a collar portion of the dispenser is restable, and elastic means for fastening the beverage dispenser to the vertical backing strip at a location above the first horizontal support, and the cup support comprises a second horizontal support joined to the backing strip at a location below the first horizontal support, for supporting a cup in position to receive beverage being dispensed from the dispenser when said dispenser is in position in the holder, and at least one vertical reinforcing and cup retaining member joined to the first and second horizontal supports and the backing strip to strengthen the combined holder and support and to help to maintain the cup in position in the combined holder and support in a moving vehicle.

8. A combined holder and support according to claim 1 wherein the flexible means and the means for fastening of a lower portion of a combined holder and support to the lower dashboard surface include hook and loop fasteners, first portions of which are fastenable to the dashboard and second portions of which are readily removably fastenable to such first portions.

9. A combined holder and support according to claim 7 wherein the flexible strap member, flexible strap member portion and vertical backing strip are of a synthetic organic polymeric thermoplastic material, of a thickness which would normally be form-retaining, the flexible strap and flexible strap portion are scored or otherwise weakened so as to be bendable to conform to the shape of the upper dashboard surface and to be fastenable to the lower dashboard surface and so as to facilitate cutting of such flexible strap member and flexible strap member portion to length suitable for the dashboard on which the combined holder and support is to be installed, and the means for holding the combined holder and support to the upper and lower portions of the dashboard include hook and loop fasteners, first portions of which are fastenable to the dashboard and second portions of which are readily removably fastenable to the first portions.

10. A combined holder and support according to claim 9 wherein the hook and loop fasteners fastenable to the upper portion of the dashboard include first portions fastenable to the dashboard upper surface and second portions readily removably fastenable to the first portions, with the hook and loop orientations being such that the force needed for disengagement of the first portions from the second portions is greatest in a horizontal plane.

11. A combined holder and support according to claim 9 wherein there is provided for insertion in an opening in the first horizontal support of the holding means a removable auxiliary support which rests on said first support, conforms to the opening therein and reduces the opening to facilitate supporting of a beverage dispenser of different construction than that for which the first horizontal support is appropriate.

12. A combined holder and support according to claim 3 wherein the means for fastening a lower portion of the combined holder and support to the lower dashboard surface holds said lower portion away from the dashboard.

13. A combined holder and support according to claim 9 wherein substantially all of such holder and support is of synthetic organic polymeric plastic material, except for the elastic means and the hook and loop fasteners, and the first portions of the hook and loop fasteners include pressure sensitive adhesive for fastening to the dashboard.

14. A holder for a beverage dispenser, adapted for installation on any of a plurality of different types of vehicle dashboards having upper surfaces of different shapes and having lower portions of different shapes, which comprises means for holding such beverage dispenser in dispensing position in the holder when the holder is installed on such a dashboard, flexible means for conforming to any of a plurality of different upper surfaces of any of such vehicle dashboards and for supporting said dispenser holding means by fastening of an upper portion thereof to such upper dashboard surface, and means for contacting lower surfaces of any of such vehicle dashboards, for holding said dispenser holding means to said lower dashboard surface by fastening of a lower portion of said dispenser holding means to a surface of such lower dashboard portion.

15. A holder according to claim 14 wherein the means for supporting the holding means by fastening of an upper portion thereof to the upper dashboard surface includes hook and loop fastening means including a first part fastenable to the dashboard surface and a second part which is readily removably fastenable to the first part.

16. A combination of a beverage dispenser, a cup and a combined holder for the beverage dispenser and support for the cup which comprises a beverage dispenser, a cup, and a combined holder for the dispenser and support for the cup, which combined holder and support is adapted for installation of any of a plurality of different types of vehicle dashboards having upper surfaces of different shapes and having lower surfaces of different shapes, and which comprises means for holding such beverage dispenser in a dispensing position when the combined holder and support is installed on such dashboard, means for supporting such cup in alignment with such beverage dispenser, so that beverage dispensed from the dispenser will be dispensed into such supported cup, flexible means for conforming to any of a plurality of different upper surfaces of any of such vehicle dashboards and supporting said dispenser holding means and cup support by fastening of an upper portion of said holding means to such upper dashboard surface, and means for conforming to any of a plurality of different lower surfaces of any of such vehicle dashboards, for holding said combined holder and support to said lower dashboard surface by fastening of a lower portion thereof to such lower surface.

17. A combined holder and support according to claim 4 wherein the support for the cup includes a walled opening, the wall of which is adapted to hold the cup in position by contact with an exterior cup wall.

18. A combined holder and support according to claim 17 wherein the support for the cup is a walled opening in an adapter which is positioned above a larger walled opening, with the wall of the opening in the adapter being adapted to hold the cup in position by contact with an exterior wall thereof and the wall of the larger walled opening being adapted to support a larger cup by contact with an exterior wall thereof.

19. A combined holder and support according to claim 1 wherein means for holding the lower portion of the combined holder and support holds it away from the dashboard.

20. A holder according to claim 14 wherein the means for holding the lower portion of the holder holds it away from the dashboard.

* * * * *